(12) United States Patent
Neumann et al.

(10) Patent No.: US 12,206,228 B2
(45) Date of Patent: Jan. 21, 2025

(54) ELECTRICAL CONDUCTOR FOR CONDUCTING ELECTRICAL CURRENT THROUGH AN OPENING OF A HOUSING WALL, AND METHOD FOR PRODUCTION

(71) Applicant: BRUSS SEALING SYSTEMS GMBH, Hoisdorf (DE)

(72) Inventors: Samuel Neumann, Ahrensburg (DE); Timo Besoke, Labenz (DE); Jürgen Berg, Barsbüttel (DE); Manfred Brand, Tremsbüttel (DE)

(73) Assignee: BRUSS SEALING SYSTEMS GMBH, Hoisdorf (DE)

( * ) Notice: Subject to any disclaimer, the term of this patent is extended or adjusted under 35 U.S.C. 154(b) by 188 days.

(21) Appl. No.: 17/966,850

(22) Filed: Oct. 16, 2022

(65) Prior Publication Data
US 2023/0128253 A1 Apr. 27, 2023

(30) Foreign Application Priority Data
Oct. 26, 2021 (DE) ...................... 10 2021 127 845.7

(51) Int. Cl.
*H02G 15/013* (2006.01)
(52) U.S. Cl.
CPC ................................ *H02G 15/013* (2013.01)
(58) Field of Classification Search
None
See application file for complete search history.

(56) References Cited

U.S. PATENT DOCUMENTS 2,909,740 A 10/1959 Seidel et al.
3,388,212 A 6/1968 Nichols et al.
(Continued)

FOREIGN PATENT DOCUMENTS

DE 1943978 U 8/1966
DE 102009056043 A1 6/2011
(Continued)

OTHER PUBLICATIONS

Search Report issued by the German Patent and Trademark Office with respect to the German priority application No. 10 2021 127 845.7.

*Primary Examiner* — Krystal Robinson
(74) *Attorney, Agent, or Firm* — SALIWANCHIK, LLOYD & EISENSCHENK

(57) ABSTRACT

The invention relates to an electrical conductor for the conduction of electrical current through an opening of a housing wall, wherein the electrical conductor is enclosed, at least in a first sealing segment by a sealing body made from an elastic material. The electrical conductor can be inserted with the sealing body into an opening of a housing wall for sealing between sealing body and housing wall. The electrical conductor has a materially bonded connection to the sealing body, and a fastening part is provided on the conductor and has an axial through-opening through which the electrical conductor is inserted, wherein the fastening part extends radially, starting from the axial through-opening, in a first axial segment which has the maximum radial extension of the fastening part perpendicular to the axial through-opening. The fastening part has, on one side or two sides of the first axial segment, a second axial segment and/or a third axial segment respectively forming a radially circumferential separation region for a casting tool. The invention furthermore relates to a corresponding method for production.

13 Claims, 4 Drawing Sheets

(56) References Cited

U.S. PATENT DOCUMENTS

| | | | |
|---|---|---|---|
| 6,233,782 B1* | 5/2001 | Regele | F16L 41/088 |
| | | | 24/584.1 |
| 2011/0127730 A1 | 6/2011 | Seryi et al. | |
| 2011/0187057 A1* | 8/2011 | Urbaniak | H01R 43/005 |
| | | | 277/314 |
| 2013/0126230 A1* | 5/2013 | Marold | F16L 5/10 |
| | | | 264/46.4 |

FOREIGN PATENT DOCUMENTS

| | | | | |
|---|---|---|---|---|
| DE | 102013005724 A1 * | 10/2014 | ....... | B29C 45/14221 |
| DE | 102018109863 B4 | 1/2020 | | |
| DE | 102019219377 A1 | 6/2021 | | |
| DE | 102022124664 A1 * | 3/2024 | | |

* cited by examiner

ELECTRICAL CONDUCTOR FOR CONDUCTING ELECTRICAL CURRENT THROUGH AN OPENING OF A HOUSING WALL, AND METHOD FOR PRODUCTION

CROSS-REFERENCE TO RELATED APPLICATIONS

This application claims priority to German Patent Application No. 10 2021 127 845.7, filed on Oct. 26, 2021; which is incorporated in its entirety herein.

FIELD OF THE INVENTION

The present invention relates to an electrical conductor for conducting electrical current through an opening of a housing wall according to the preamble of claim 1, a corresponding housing wall according to the preamble of claim 10, and a method for producing a corresponding electrical conductor according to the preamble of claim 11.

BACKGROUND OF THE INVENTION

In electric motors and generators, a plurality of electrical conductors or conductor rails are normally to be guided through a housing wall which separates two spaces, for example a housing of an electric motor and a housing of a power electronics or the environment, from one another. The feedthrough of the conductor serves to transmit electrical power between the respective spaces, wherein at the same time an optimally good sealing with respect to liquid media, for example oil, is required in order to prevent the ingress or creep of oil, for example up to a power electronics.

For improved sealing, for example, flow path extensions in the form of flutings and labyrinthine structures in the fed-through conductor, which normally consists of copper or a copper alloy, are known from the prior art. The flow path extensions are intended to prevent or at least significantly impede an infiltration of oil between the conductor and a cast plastic which forms the housing wall. It has been found that such a use of flow path extensions does not constitute sufficient sealing against oil.

BRIEF SUMMARY

The object of the present invention is to provide a feedthrough for an electrical conductor through a housing wall, which feedthrough enables a sealing that can be produced cost-effectively and is improved, in particular with respect to oil, as well as a corresponding method for production.

The object is achieved by the features of the independent claims. In order to achieve the object, an electrical conductor for the conduction of electrical current through an opening of a housing wall is proposed, wherein the electrical conductor is enclosed, at least in a first sealing segment, by a sealing body made of an elastic material, wherein the electrical conductor with the sealing body can be inserted into an opening of a housing wall for sealing between sealing body and housing wall. It is proposed that the electrical conductor has a materially bonded connection to the sealing body, and that a fastening part is provided on the conductor, which fastening part has an axial through-opening through which the electrical conductor is inserted. The fastening part extends radially, starting from the axial through-opening in a first axial segment which has the maximum radial extension of the fastening part perpendicular to the axial through-opening, wherein the fastening part has a second axial segment and/or a third axial segment on one side or two sides of the first axial segment, which second and/or third axial segment forms a respective radially circumferential separation region for a casting tool, in particular an injection-molding tool.

DETAILED DESCRIPTION

The proposed electrical conductor is preferably non-positively and/or positively connected to the fastening part via the feedthrough of the electrical conductor through the axial through-opening. Furthermore, a non-positive and/or positive connection between the electrical conductor and the fastening part may preferably likewise be achieved via the sealing body. The fastening part is preferably fixed to the electrical conductor in all axes by the sealing body.

This enables a very simple assembly of the electrical conductor with the fastening part for the feedthrough of the electrical conductor through an opening in a housing wall, as well as a good sealing of the feedthrough. The sealing here takes place between a housing wall and the sealing body, preferably via the radially circumferential surface of the sealing body, and between the sealing body and the electrical conductor via the materially bonded connection to the sealing body. The sealing body preferably has at least one sealing bead which preferably runs radially around the sealing body. Furthermore, the sealing bead is preferably configured to be inserted into an opening of a housing wall and to seal via a corresponding sealing press fit with respect to the housing wall. The materially bonded connection may take place in particular by vulcanization in a single casting process, in particular an injection molding process. The fastening part, which is preferably a plastic part, may thereby be cost-effectively prefabricated separately, for example in a separate casting method, in particular an injection molding process. During the production of the materially bonded connection between electrical conductor and the sealing body, the attached fastening part is preferably permanently fixed to the electrical conductor in the same working step. In possible embodiments, a materially bonded connection or bonding between the sealing body and the attached fastening part may be produced in order to further improve the fixing of the fastening part. In alternative embodiments, no materially bonded connection or bonding between the sealing body and the attached fastening part is produced since this is not relevant to the sealing at this point.

The second and/or third axial segment enable the separation or pressing of the fastening part in a casting tool in a radially circumferential separation region. An overmolding of the fastening part is thereby prevented so that the material of the sealing body does not accumulate in undesirable regions on the outside of the fastening part. Furthermore, the separation regions or separation edges for this purpose serve to achieve a necessary injection pressure for mold filling in the casting process.

The electrical conductor preferably has two separation regions for the casting tool, in particular the injection-molding tool, between which regions are arranged the fastening part and the sealing body. The separation regions at the electrical conductor serve to limit the volume for the sealing body at the electrical conductor during the production of the sealing body.

The corresponding separation regions enable the vulcanization of the sealing body onto the electrical conductor, which preferably consists of copper or a copper alloy, and in advantageous embodiments additionally onto the fastening part in one working step.

According to one development, it is proposed that the fastening part be fastenable to a housing wall with at least one fastening means. A corresponding fastening means can, for example, be a screw or a screw connection. The electrical conductor may thus be inserted in a simple manner through an opening of a housing wall, be sealed with the sealing body with respect to the housing wall, and be fixed to the housing wall with the fastening part via the fastening means.

In advantageous embodiments, the radial extension in the first radial segment is greater than an opening in the housing wall through which the electrical conductor is guided and against which the sealing body is pressed and sealed, so that the fastening part may rest against the housing wall.

A cost-effective production of an electrical conductor is facilitated, which electrical conductor is sealed with a materially bonded sealing body and may be fixed in a simple manner with the fastening part to a housing or a housing wall.

The fastening part can, for example, be mounted like a cover on openings of a housing or housing part.

The elastic material of the sealing body is preferably an elastomer that is impermeable with respect to oil. This improves the sealing against oil, in particular the sealing against a creep of oil through the material of the sealing body. At the same time, improved media resistance of the elastic material results. In an advantageous embodiment, the material of the sealing body is homogeneous. In alternative embodiments, the elastic material of the sealant may preferably consist of a combination of several elastomers which are connected to one another in layers. For example, this may be used in order to adjust advantageous material properties in the combination, and/or to reduce the proportion of expensive elastomers while maintaining sufficient properties, which may possibly justify a corresponding additional production step. In an advantageous embodiment, the elastic material of the sealing body has a barrier layer of fluorothermoplastics.

According to a development, it is proposed that the sealing body has at least a fraction of fluoro-rubber (FKM), ethylene acrylate rubber (AEM), acrylate rubber (ACM), acrylonitrile butadiene rubber (NBR), chloroprene rubber (CR), ethylene propylene diene rubber (EPDM), and/or hydrogenated nitrile rubber (HNBR). The cited materials enable a good bonding to a metallic conductor, in particular copper, and a good impermeability, in particular against oil, wherein ethylene propylene diene rubber (EPDM) is suitable for other liquid media except oil and has a sufficient temperature range for use in the automotive field.

The electrical conductor preferably has an outer contour that is rounded in cross section, at least in the first sealing segment. Leaks due to micro-gaps or micro-kerfs, which cannot be avoided via production technology, as well as excessive stresses are thereby avoided at sharp edges of the electrical conductor with respect to the sealing body. Via the rounded outer contour, a binder and/or adhesion promoter may also be applied uniformly to the electrical conductor, at least in the first sealing segment. A non-uniform distribution and/or wetting of the binder and/or of the adhesion promoter, for example at sharp edges, may be avoided in this way. In cross section of the electrical conductor, the outer contour further preferably has curvatures with a radius of at least 0.1 mm, preferably at least 0.4 mm, more preferably at least 0.7 mm.

The materially bonded connection between the electrical conductor and the elastic material of the sealing body, and optionally additionally between the fastening part and the electrical conductor, can, for example, take place via vulcanization of the elastic material of the sealing body or of a sealant. Via vulcanization of the elastic material, preferably an elastomer, more preferably a rubber, a bonding or connection between the elastic material and the electrical conductor, preferably made of metal, for example copper or copper alloy, and optionally additionally between the elastic material and the fastening part, preferably made of plastic, for example a thermoplastic, may be created which enables improved sealing, in particular improved micro-gap sealing.

The sealing of the electrical conductor, in particular against oil, is markedly improved by the vulcanized-on sealing body. The elastic material of the sealing body is preferably electrically insulating. Accordingly, the sealing body is preferably electrically insulating. The sealing body has corresponding dimensions so that neither breakdown and/or flashover nor significant creepage currents may arise with respect to a fastening part, which may be made of metal, for example. The dimensions, diameters, and/or clearances are here dependent on the maximum voltage. Accordingly, an electrical insulation with respect to a fastening part may be achieved by the sealing body. Furthermore, mechanical vibrations of the electrical conductor can be damped and/or decoupled by the sealing body. As a result of the elastic material of the sealing body, it is also possible to compensate for different coefficients of thermal expansion of the materials and thermal expansion differences in the case of an inhomogeneous temperature distribution, whereby temperature-related stresses can be avoided.

The conduction of the electrical current through the fastening part relates to the conduction from one side of the fastening part or a housing wall to the other side; the electrical current flows through the electrical conductor and not through the substance of the fastening part itself. The electrical conductor may be a copper rail, for example.

It is further proposed that the fastening part consists of an unfilled or filled plastic. The plastic is preferably impermeable, preferably with respect to oil. The plastic may be a thermoplastic, for example. Furthermore, the plastic is preferably low-halogen or halogen-free, and thus suitable for installation with electrical circuit boards and sensors. Advantageous fillers for the filled plastic may be, for example, glass fibers, in particular short fibers, and/or glass beads. A glass-fiber-reinforced and/or glass-bead-reinforced plastic achieves good mechanical properties or is in particular suitable as an electrical insulator with respect to the fed-through conductor. The filler material of the filled plastic is preferably a non-conductive material.

According to an advantageous development, it is proposed that the radial extension of the fastening part from the axial through-opening in the second axial segment and/or third axial segment is in a range of between 0.5 mm and 5 mm, preferably between 1 mm and 3 mm.

This enables an effective pressing of the casting tool on the fastening part in the region of the first and/or third axial extension in order to restrict the casting space, prevent a deformation of the fastening part and, above all, prevent an uncontrolled overflow of the elastic material of the sealing body during the casting process. The fastening part is supported in the region of the axial through-opening by the electrical conductor inserted therein.

The wall thickness in the radial direction, starting from the axial through-opening of the fastening part, is therefore preferably 0.5 mm and 5 mm, more preferably between 1 mm and 3 mm.

It is further proposed that the second axial segment and/or third axial segment of the fastening part has an outer contour that is rounded in cross section.

The rounded outer contour of the second and/or third axial segment of the fastening part enables an optimally uniform contact pressure by a casting tool. Furthermore, the insertion and/or removal process with respect to the casting tool may also be simplified.

According to a development, it is proposed that the electrical conductor has an outer contour that is rounded in cross section, axially adjacent to the fastening part and/or the sealing body.

The rounded outer contour in this region of the electrical conductor enables a good seal with respect to a casting tool and a separation region on the electrical conductor. In particular, an undesired overflow of the elastic material of the sealing body in the production of the sealing body, for example in corners, may be avoided. The insertion and/or removal process with respect to the casting tool may likewise be simplified. In particular, an application of a binder and/or adhesion promoter may be facilitated by the rounded outer contour. Furthermore, less of a notch effect in the material of the sealing body is achieved.

In an advantageous embodiment, the electrical conductor has an outer contour that is rounded in cross section, at least in the first sealing segment.

The rounded outer contour in the cross section of the electrical conductor in at least the first sealing segment with respect to the sealing body, and/or in a further sealing segment and/or a segment between fastening part and electrical conductor, and/or in a separation region, has curvatures with a radius of at least 0.1 mm, preferably at least 0.4 mm, more preferably at least 0.7 mm.

According to a development, it is proposed that the sealing body has, at least on one side, an axial second sealing segment with the fastening part, said axial second sealing segment running around the axial through-opening.

According to a development, it is proposed that at least a segment of the sealing body extends in the through-opening between fastening part and electrical conductor.

A fixing of the fastening part by means of the sealing body is thereby made possible via a region which is extended as far as possible, whereby the second circumferential sealing segment may be mechanically relieved. The fastening part is thus preferably undermolded with the elastic material of the sealing body in the region of the through-opening. The segment of the sealing body in the through-opening enables a press fit and/or materially bonded connection of the fastening part on the electrical conductor.

It is further proposed that the fastening part has grooves running axially in the axial through-opening.

The sealing body preferably extends in the grooves of the fastening part, wherein the sealing body is preferably materially bonded to the groove surface.

The intermediate regions or webs between the axially running grooves preferably rest against the electrical conductor and serve for radial guidance of the fastening part on the electrical conductor before the sealing body is produced. Furthermore, the intermediate regions or webs between the axially running grooves may absorb the pressing forces of a casting tool and be supported on the electrical conductor.

According to a development, it is proposed that a latching position is provided on the electrical conductor, at which latching position the fastening part is axially fixed unidirectionally or bidirectionally by means of a positive fit. For example, a fixing in further directions is also possible.

A latching position may, for example, be a depression, e.g., a hole or a blind hole or a groove, in the electrical conductor. Furthermore, a latching position may be, for example, a stop on the electrical conductor against which the fastening part abuts or rests in an axial end position after through-insertion.

A latching element of the fastening part, which, for example, may be provided in the through-opening, may engage in the latching position, for example.

By means of the latching position, the fastening part may be pre-positioned on the electrical conductor before the sealing body is formed in particular by vulcanization. The position may either be limited in an axial direction (unidirectionally), for example by a stop, or in both axial directions (bidirectionally), for example by a blind hole in the electrical conductor and a latching element in the through-opening of the fastening part.

In one possible embodiment, three electrical conductors may, for example, be inserted through the fastening part; the fastening part has a corresponding number of through-openings for this purpose. Given a plurality of fed-through electrical conductors, the electrical conductors are preferably respectively jointly enclosed in a vulcanized sealing body in the first sealing segment. In possible embodiments, a plurality of fed-through electrical conductors are respectively enclosed by a vulcanized sealing body at the first sealing segment, wherein the sealing body which encloses the plurality of conductors is designed to be continuous.

In an advantageous embodiment, the second axial segment of the fastening element has a radial extension and outer contour which corresponds to an opening of a housing wall. In a further advantageous embodiment, the sealing body has, adjacent to the second axial segment, at least one radially running sealing bead which has a greater radial extension than the second axial segment, so that, when inserting the electrical conductor with the sealing body and the fastening part into an opening of a housing, a sealing press fit of the sealing body with the inner lateral surface of the opening occurs, whereas the second axial segment of the fastening element may rest in the opening.

Furthermore, in order to achieve the object, a housing wall is proposed, wherein the housing wall has an opening, wherein an electrical conductor according to one of claims 1 to 9 is inserted into the opening of the housing wall, wherein the second axial segment of the fastening part centers the electrical conductor in the opening of the housing wall.

By centering the electrical conductor by means of the second axial segment, it can be ensured that the sealing body made of an elastic material, which seals the electrical conductor with respect to the housing wall, in particular with respect to the lateral surface of the opening of the housing wall, is not too strongly loaded or relieved on one side given mechanical loads on the electrical conductor, whereby an insufficient sealing press fit between the sealing body and the housing wall can be reliably avoided. Rather, mechanical loads can thereby be transmitted between housing wall and electrical conductor via the fastening element, in particular via its second axial segment.

In a preferred embodiment, the second axial segment is insignificantly smaller than the opening in the housing wall so that the second axial segment of the fastening part can preferably be inserted positively into the opening of the housing wall. For further securing, the fastening part can be screwed to the housing wall, wherein the screw connection can in particular prevent the second axial segment from slipping out of the opening of the housing.

Furthermore, a method for producing an electrical conductor according to one of claims 1 to 9 is proposed to achieve the object, characterized by the steps of:
- providing an electrical conductor and a fastening part with a through-opening for the electrical conductor;
- attaching the fastening part to the electrical conductor;
- inserting the electrical conductor with the fastening part into a casting tool, in particular an injection-molding tool;
- vulcanizing and/or injecting a sealing body made of an elastic material at least onto a first, circumferential sealing segment of the electrical conductor, and vulcanizing and/or injecting at least onto one segment of the fastening part.

By means of vulcanization and/or injection of a sealing body onto the electrical conductor, in particular a materially bonded connection to the sealing body can be produced, so that an oil-tight sealing of the through-opening of the electrical conductor results overall in one working step. Via the vulcanization and/or injection, the fastening part can be fixed to the electrical conductor and, in possible embodiments, can be materially bonded to said electrical conductor at the same time.

According to a development, it is proposed that the fastening part is pressed in the casting tool, in particular injection-molding tool, at least at one separation region of the fastening part.

A sealing of the fastening part with respect to the casting tool is thereby achieved so that an undesired flow or even overmolding of the elastic material to undesired surfaces in outer regions of the fastening part, for example to the outer surface of the first axial segment of the fastening part, is prevented.

It is further proposed that the electrical conductor in the casting tool, in particular injection-molding tool, is pressed against the electrical conductor at least at one separation region of the electrical conductor. The region for the formation of the sealing body on the electrical conductor is thereby limited. This limitation preferably takes place on both sides of the fastening part on the electrical conductor.

According to a development, it is proposed that the electrical conductor be pre-treated before the attachment of the fastening part, preferably compressed air blasting with a solid blasting agent and/or pre-treatment by means of laser beams and/or application of an adhesion promoter.

The compressed air blasting with a solid blasting agent serves to pre-treat the conductor in order to clean the surface and set an advantageous roughness. At the same time, sharp edges or ridges on the conductor may be removed. The compressed air blasting preferably takes place with corundum as a solid blasting agent so that a high surface roughness of the conductor, for example made of copper or a copper alloy, may be achieved, with which a good mechanical bonding and an increased contact surface may be achieved.

The application of an adhesion promoter also serves to pre-treat the conductor, and the application preferably takes place after a rounding, and further preferably after a compressed air blasting with solid blasting agents. The rounding and the compressed air blasting may improve the application of the adhesion promoter, in particular the wetting of the surface. The adhesion promoter may further improve the bond between the conductor, in particular in the first sealing segment, and the sealing body so that an especially impermeable seal may be achieved.

In an advantageous development, it is proposed that the attachment takes place up to a latching position. The fastening part may thereby be pre-fixed with respect to the electrical conductor, whereby the further handling, in particular when inserting the electrical conductor with the fastening part into a casting tool, is simplified.

BRIEF DESCRIPTION OF THE FIGURES

The invention is explained below using preferred embodiments with reference to accompanying figures. Shown are:

FIG. 1 shows an advantageous exemplary embodiment of an electrical conductor 10 in a plan view, which electrical conductor is inserted through an axial through-opening 14 of the fastening part 11 and is fixed, with respect to the fastening part 11, with a sealing body 12 made of an elastic material. The sealing body 12 fixes the fastening part 11 with respect to the electrical conductor 10.

Figure 1:
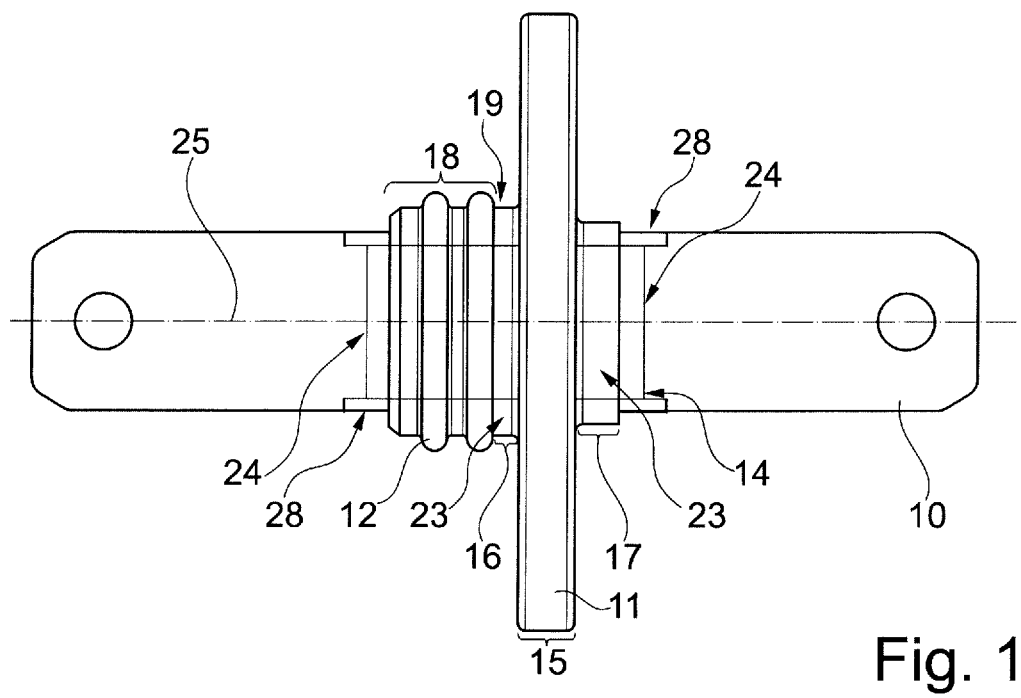
FIG. 1 an electrical conductor with a sealing body, guided through a fastening part.

In the depiction of FIG. 1, a plurality of axial segments 15, 16, 17 of the fastening part 11 are apparent along the axis 25, wherein the first axial segment 15 has the maximum radial extension of the fastening part 11 perpendicular to the axis 25. Adjoining to the side of the first axial segment 15 of the fastening part 11, on the left side in the depiction, is the second axial segment 16 to which the sealing body 12 directly adjoins. The third axial segment 17 of the fastening part 11 adjoins on the right side.

The second and third axial segments 16, 17 respectively have a radially circumferential separation region 23 for a casting tool, which is provided for the production of the sealing body 12 in a casting process. For this purpose, the electrical conductor 10 and the fastening part 11 are inserted preassembled into the casting tool. Adjacent to the third axial segment 17 of the fastening part 11, the electrical conductor 10 has a further separation region 24 for the casting tool. In the separation region 24, the electrical conductor 10 has, among other things, an outer contour 28 that is rounded in cross section. A further separation region 24 at the electrical conductor 10 is provided adjacent to the sealing body 12 and adjacent to the first sealing segment 18 on the other side of the fastening part 11, which likewise has an outer contour 28 that is rounded in cross section.

The sealing body 12 made of an elastic material encloses the electrical conductor 10 radially circumferentially at least at one first sealing segment 18. The elastic material of the sealing body 12 has, at least in the first sealing segment 18, a materially bonded connection to the electrical conductor 10, whereby a corresponding advantageous sealing effect is achieved. The electrical conductor 10 is made of copper or a copper alloy, for example. The sealing body 12 furthermore has at least one positive and/or non-positive connection to the fastening part 11, wherein the connection may also be a material bond in possible exemplary embodiments.

In possible advantageous exemplary embodiments, the sealing body 12 additionally has a materially bonded connection to the fastening part 11. A corresponding materially bonded connection may, for example, be present in this exemplary embodiment with the second axial segment 16 of the fastening part 11, on a circumferential segment 19 between the fastening part 11 and the sealing body 12. Accordingly, the feedthrough of the electrical conductor 10 through the through-opening 14, which extends along axis 25 through all axial segments 15, 16, 17 of the fastening part 11, is sealed by means of the sealing body 12. The fastening part 11 may additionally be sealed against a housing wall 13, for example a transmission housing, with a further seal (not shown).

The fastening part 11 may, for example, hold the electrical conductor 10 by means of a direct non-positive fit and/or positive fit, and/or via an indirect non-positive fit and/or positive fit via the sealing body 12.

Figure 2:
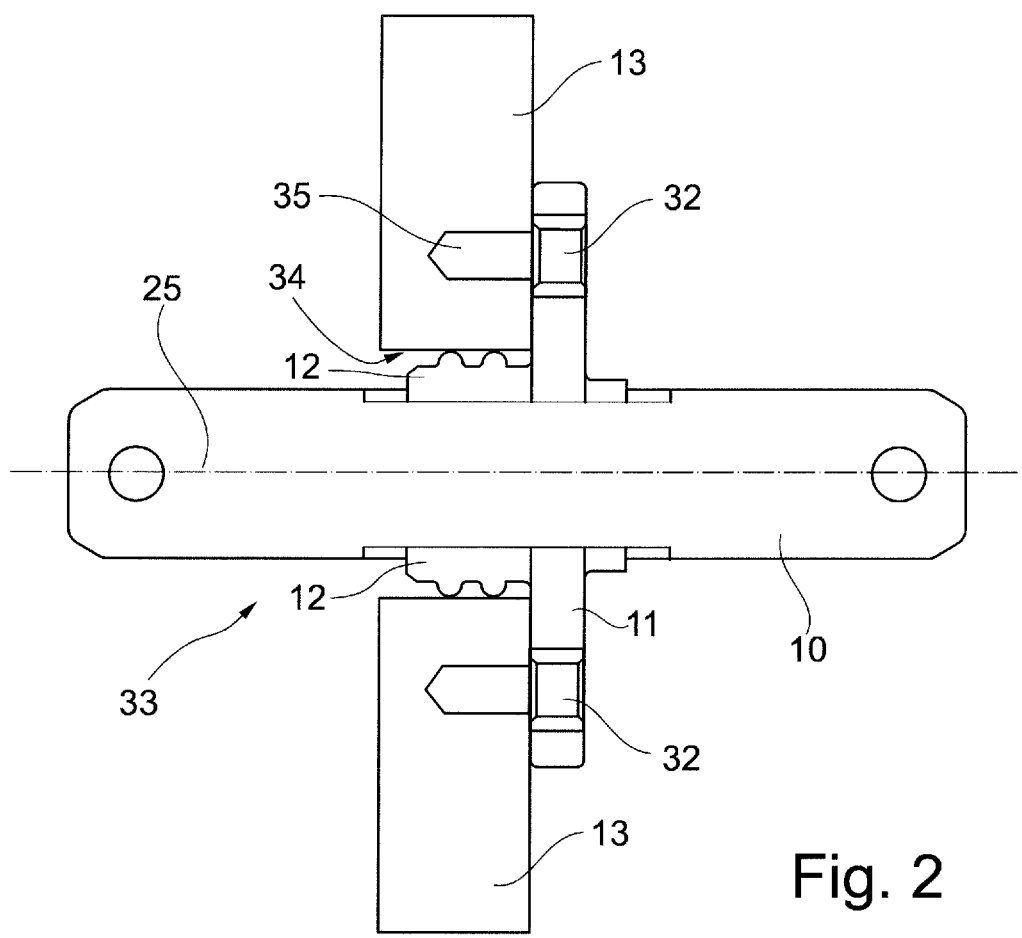
FIG. 2 an electrical conductor with a sealing body, inserted into an opening of a housing wall.

Shown in FIG. 2 is a sectional view of an electrical conductor 10 with a sealing body 12 which is inserted into an opening 33 of a housing wall 13. The electrical conductor 10 is therefore guided through the housing wall 13 and sealed by means of the sealing body 12. As is apparent in FIG. 2, the sealing body 12 is forced or pressed against the lateral surface 34 of the opening 33 of the housing wall 13. The sealing body 12 made of elastic material therefore preferably has an oversize relative to a corresponding opening 33 of a housing wall 13, in order to achieve a sufficient contact pressure.

In this exemplary embodiment, the fastening part 11 has two through-openings 32. For example, by means of screws as fastening means (not shown), the fastening part 11 may be fastened to the housing wall 13, for example in a corresponding blind hole 35. Alternatively, in one possible exemplary embodiment, the fastening part 11 may be fastened by clip to the housing wall 13. The electrical conductor 10 is thereby positioned and held relative to the housing wall 13, wherein the sealing points may be kept free of mechanical loads.

In further possible exemplary embodiments, the second axial segment 16, or alternatively the third axial segment 17, of the fastening part 11 may, for example, assume additional guide tasks in a corresponding housing wall 13 or another element of the housing. Given corresponding radial extension, the segment 16 may assume a centering function with respect to a housing wall 13 or an opening 33. It may thereby be ensured that the elastic material of the sealing body 12 in the installed state is not loaded by external force on one side so that a weaker press fit or relief of one side or location, which could lead to an insufficient sealing press fit, cannot occur.

Figure 3:
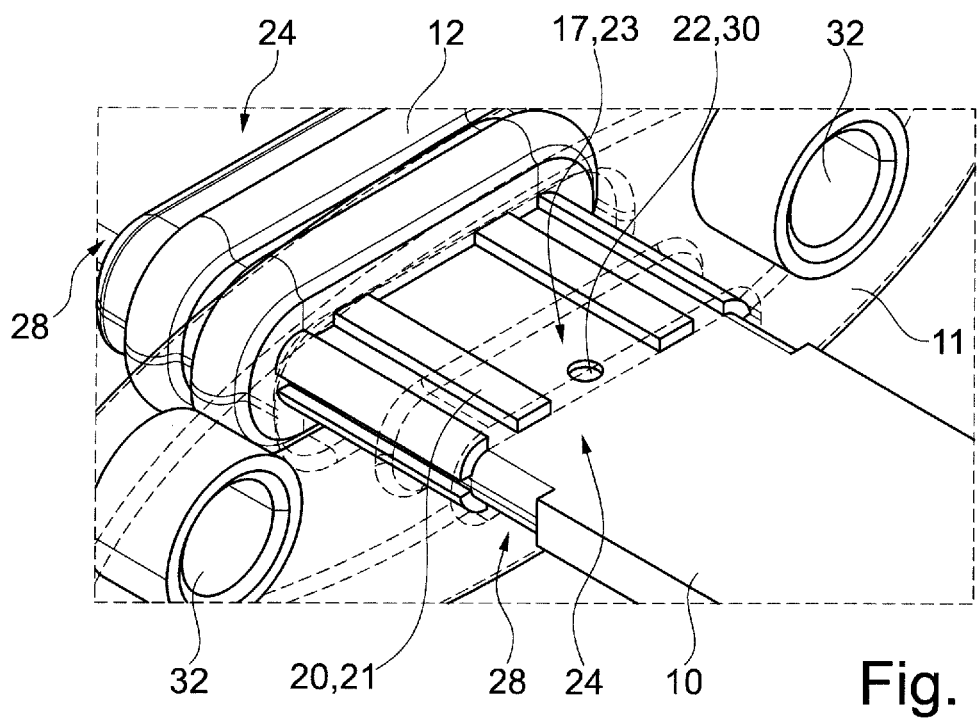
FIG. 3 a detail view of a sealing body in a through-opening of a fastening part, in an on-edge presentation.

Shown in FIG. 3 is a detailed view of the through-opening 14 of the fastening part 11 with electrical conductor 10 inserted through. The fastening part 11 is here shown transparent so that the cast sealing body 12 is apparent in the through-opening 14. In this exemplary embodiment, the sealing body 12 extends with a segment 20 through the entire through-opening 14, up to the end, via grooves 21 provided for this purpose in the through-opening 14. The fastening part 11 is therefore undermolded by the sealing body 12. Furthermore, a latching position 22 in the electrical conductor 10 is additionally apparent in which a latching element 30 of the fastening part 11 engages, so that the electrical conductor 10 and the fastening part 11 may be preassembled before the sealing body 12 is cast on. The mechanical connection between the electrical conductor 10 and the fastening part 11 is further reinforced by the production of the sealing body 12.

Furthermore, FIG. 3 shows the radially circumferential separation region 23 of the third axial segment 17 for a casting tool, for example an injection-molding tool.

Figure 4:
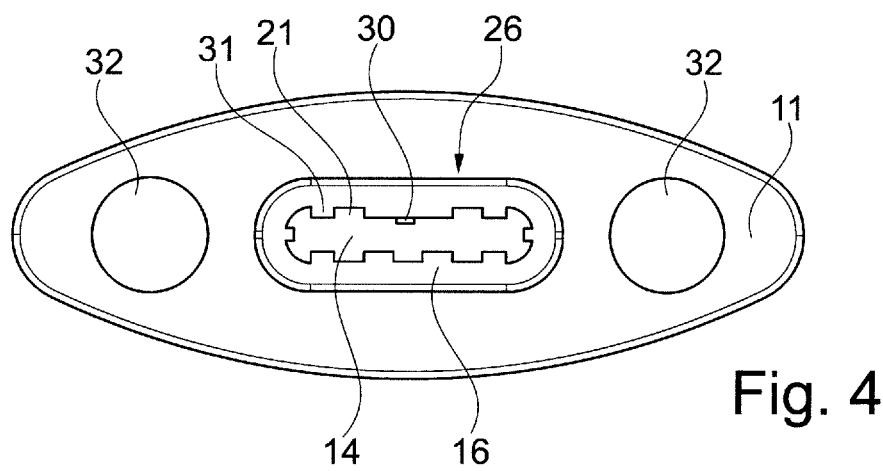
FIG. 4 an axial view of a fastening part.

Shown in FIG. 4 is the fastening part 11, individually in a side view in which the axially extending through-opening 14 is apparent. Axial grooves 21, which are separated from one another by webs 31, are provided in the through-opening 14. The webs 31 serve for the radial guidance of the electrical conductor 10. By means of a latching element 30, which is apparent in the interior of the through-opening 14, the fastening part 11 may be latched to the electrical conductor 10 at a provided axial position. By means of this pre-fixing, the sealing body 12 may subsequently be injection-molded and vulcanized in a simple manner. Furthermore, the rounded outer contour 26 of the second radial segment 16 of the fastening part 11 is apparent in this view.

Figure 5:
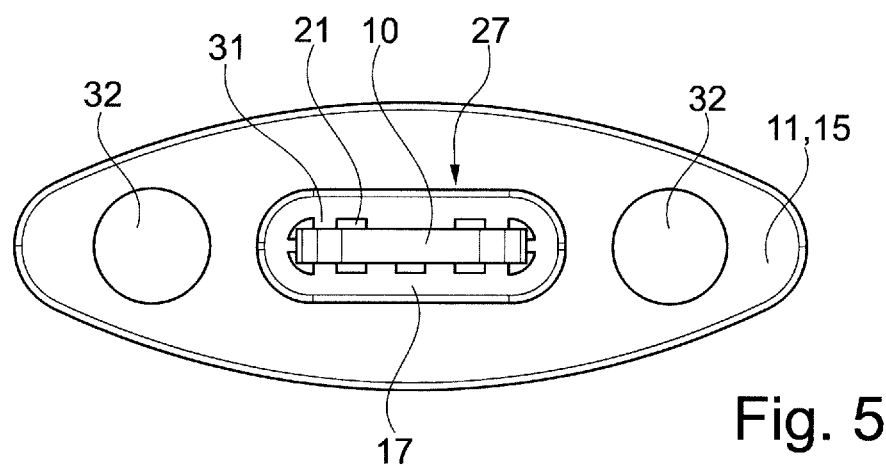
FIG. 5 an axial view of a fastening part with a through-inserted electrical conductor.

Shown in FIG. 5, in an axial view from the other side, is the fastening part 11 after being attached to the electrical conductor 10. In advantageous exemplary embodiments, the edges and corners in the interior of the through-opening 14 are not sharp-edged in order to protect a possible pre-treatment of the surface of the electrical conductor 10 against scratching during the pre-assembly or assembly, so that the materially bonded connection to the sealing body 12 is not impaired. The attached fastening part 11 latches with the latching element 30 at the latching position 22 of the electrical conductor 10. Therefore, both may jointly be handled easily and be inserted into a casting tool, in particular an injection-molding tool, in the intended position with respect to one another. The rounded outer contour 27 of the third radial segment 17 of the fastening part 11 is also apparent in this view.

The casting tool (not shown) thereby limits the volume for the production of the sealing body 12 in the following injection molding or vulcanization. In order to limit the casting volume, the casting tool presses against the separation regions 23 on the second and third axial segment 16, 17 of the fastening part 11, as well as against the separation regions 24 of the electrical conductor 10. After the injection of the elastic material of the sealing body 12 and its vulcanization or curing, the electrical feedthrough, sealed and fastened in this way, of the electrical conductor 10 through the fastening part 11 may be removed and used.

In possible exemplary embodiments, given use of some possible elastic materials or sealants, a subsequent tempering process may be advantageous in order to fully complete the vulcanization process, for example. In possible embodiments, the tempering can be omitted if the property profile of the sealant achieved during the vulcanization process is already sufficiently good.

Figure 6:
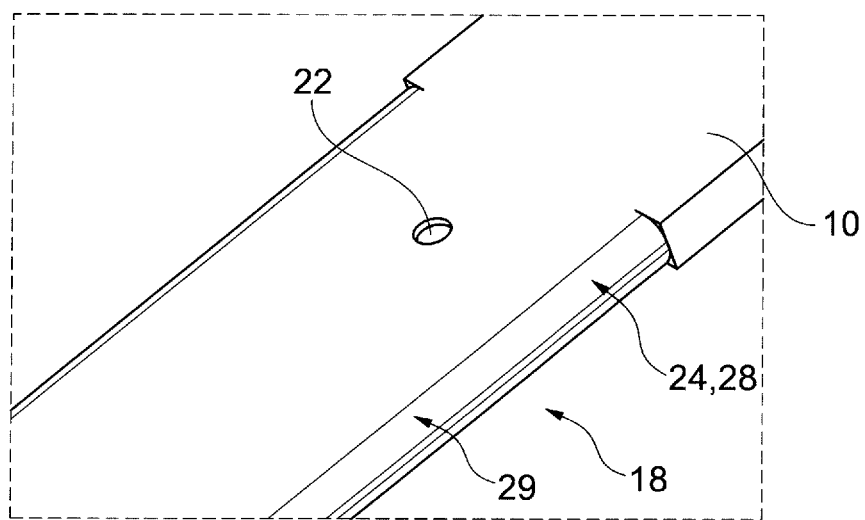
FIG. 6 a detail view of an electrical conductor with a latching position.

FIG. 6 shows the electrical conductor 10 in a detail view in which the latching position 22 is apparent as a depression in the electrical conductor 10, and the outer contour 29, rounded in cross section, in the first sealing segment 18 is apparent. The separation regions 24 likewise have an outer contour 28 that is rounded in cross section. In an advantageous exemplary embodiment, the electrical conductor 10 has a constant cross section at the two separation regions 24 and in the segment there-between.

Figure 7:
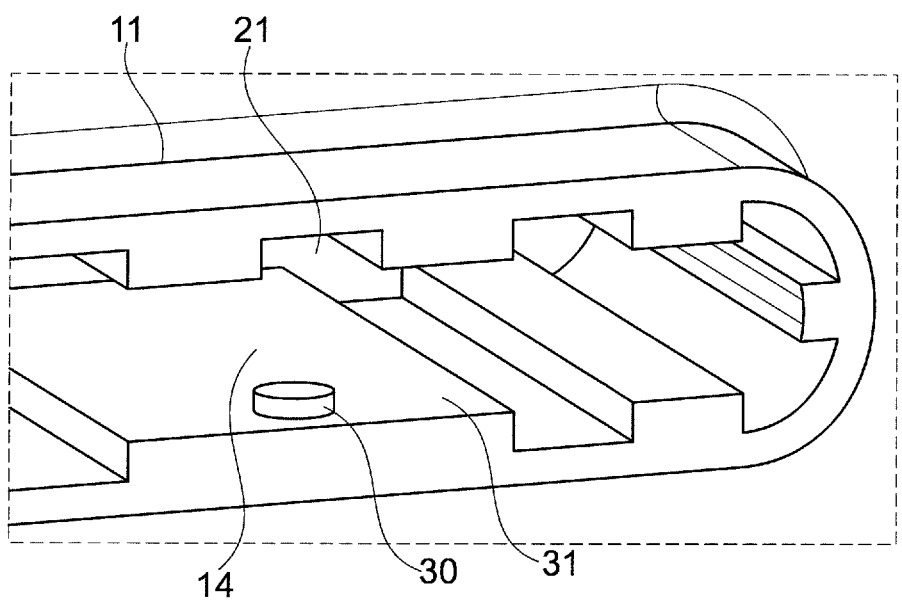
FIG. 7 a detail view of a through-opening of a fastening part with a latching element.

FIG. 7 shows the latching element 30 of the fastening part 11 in a detail view. In this exemplary embodiment, the latching element 30 is a cylinder or a latching lug which, starting from a web 31, projects into the through-opening 14 and can engage in the latching position 22 (see FIG. 5), and can fix the positioning on the electrical conductor 10 in both axial directions corresponding to the axis 25 (see FIG. 1). A fixing perpendicular to the axial direction, corresponding to the axis 25, is achieved primarily by an abutment of the webs 31 between the grooves 21 on the electrical conductor 10. After vulcanization or injection of the sealing body 12, the latter reinforces the fixing of the two parts with respect to one another, in particular by the undermolding via the through-opening 14 or the grooves 21.

Figure 8:
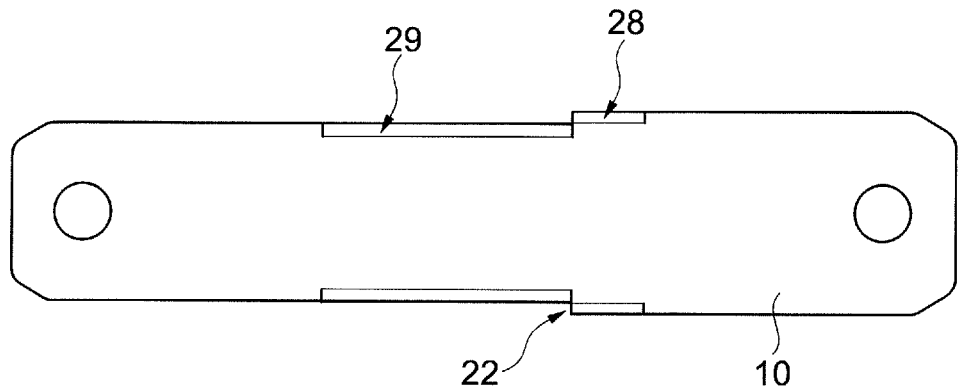
FIG. 8 a plan view of an electrical conductor with a stop.

FIG. 8 shows an alternative exemplary embodiment of an electrical conductor 10 with a stop as a latching position 22. Accordingly, the cross section of the electrical conductor 10 varies at the latching position 22 so that a fastening part 11 can be inserted on one side up to the latching position 22, which secures the fastening part 11 unidirectionally in the axial direction.

Figure 9:
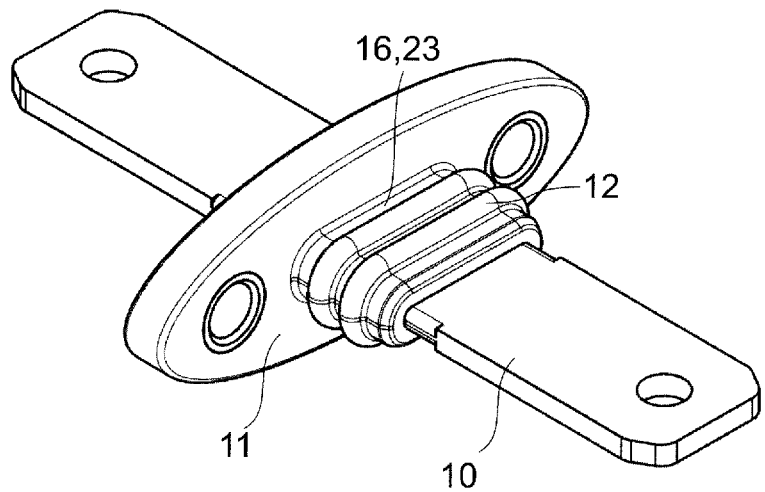
FIG. 9 an isometric view of an electrical conductor.
Figure 10:
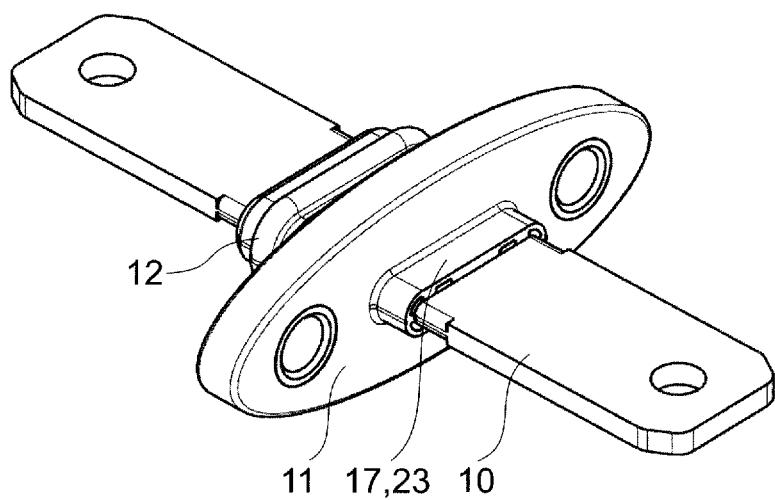
FIG. 10 a further isometric view of an electrical conductor.

FIGS. 9 and 10 respectively show an isometric view of an electrical conductor 10 with an attached fastening element 11 which is undermolded by a sealing body 12. The sealing body 12 at the fastening part 11 on the second radial segment 16 with the separation region 23 is apparent in FIG. 9. FIG. 10 shows the rearward view in which the third axial segment 17 of the fastening part 11 with the separation region 23 is apparent.

EMBODIMENTS

Embodiment 1. An electrical conductor (10) for conducting electrical current through an opening (33) of a housing wall (13), wherein
the electrical conductor (10) is enclosed, at least in a first sealing segment (18), by a sealing body (12) made from an elastic material, wherein
the electrical conductor (10) with the sealing body (12) can be inserted into an opening (33) of a housing wall (13) for sealing between sealing body (12) and housing wall (13), characterized in that
the electrical conductor (10) has a materially bonded connection with the sealing body (12), and
a fastening part (11) is provided on the conductor (10) and has an axial through-opening (14) through which the electrical conductor (10) is inserted,
wherein the fastening part (11) extends radially, starting from the axial through-opening (14) in a first axial segment (15) which has the maximum radial extension of the fastening part (11) perpendicular to the axial through-opening (14), wherein
the fastening part (11) has, on one side or two sides of the first axial segment (15), a second axial segment (16) and/or a third axial segment (17) respectively forming a radially circumferential separation region (23) for a casting tool.

Embodiment 2. The electrical conductor (10) according to embodiment 1, characterized in that the fastening part (11) can be fastened to a housing wall (13) with at least one fastening means.

Embodiment 3. The electrical conductor (10) according to embodiment 1 or 2, characterized in that the radial extension of the fastening part (11) from the axial through-opening (14) in the second axial segment (16) and/or third axial segment (17) is in a range of between 0.5 mm and 5 mm.

Embodiment 4. The electrical conductor (10) according to one of the preceding embodiments, characterized in that the second axial segment (16) and/or third axial segment (17) of the fastening part (11) has an outer contour (26, 27) that is rounded in cross section.

Embodiment 5. The electrical conductor (10) according to one of the preceding embodiments, characterized in that the electrical conductor (10) has an outer contour (28) that is rounded in cross section, axially adjacent to the fastening part (11) and/or to the sealing body (12).

Embodiment 6. The electrical conductor (10) according to one of the preceding embodiments, characterized in that the electrical conductor (10) has an outer contour (29) that is rounded in cross section, at least in the first sealing segment (18).

Embodiment 7. The electrical conductor (10) according to one of the preceding embodiments, characterized in that at least one segment (20) of the sealing body (12) extends in the through-opening (14) between fastening part (11) and electrical conductor (10).

Embodiment 8. The electrical conductor (10) according to one of the preceding embodiments, characterized in that the fastening part (11) has grooves (21) running axially in the axial through-opening (14).

Embodiment 9. The electrical conductor (10) according to one of the preceding embodiments, characterized in that provided on the electrical conductor (10) is a latching position (22), to which the fastening part (11) is axially fixed unidirectionally or bidirectionally by means of a positive connection.

Embodiment 10. A housing wall (13), wherein the housing wall (13) has an opening (33), wherein an electrical conductor (10) according to one of the preceding embodiments is inserted into the opening (33) of the housing wall (13), characterized in that the axial segment (16) of the fastening part (11) centers the electrical conductor (10) in the opening (33) of the housing wall (13).

Embodiment 11. A method for producing an electrical conductor (10) according to one of embodiments 1 to 9, characterized by the steps of:
providing an electrical conductor (10) and a fastening part (11) with a through-opening (14) for the electrical conductor (10);
attaching the fastening part (11) to the electrical conductor (10);
inserting the electrical conductor (10) with the fastening part (11) into a casting tool;
vulcanizing and/or injecting a sealing body (12) made of an elastic material at least onto a first, circumferential sealing segment (18) of the electrical conductor (10), and vulcanizing and/or injecting at least onto a segment (19) of the fastening part (11).

Embodiment 12. The method according to embodiment 11, characterized in that the fastening part (11) is pressed in the casting tool at least at one separation region (23) of the fastening part (11).

Embodiment 13. The method according to embodiment 11 or 12, characterized in that the electrical conductor (10) is pre-treated before the fastening part (11) is attached, preferably compressed air blasting with a solid blasting agent and/or pre-treatment by means of laser beams and/or application of an adhesion promoter.

Embodiment 14. The method according to one of the embodiment 11 to 13, characterized in that the attachment takes place up to a latching position (22).

The invention claimed is:
1. An electrical conductor for conducting electrical current through an opening of a housing wall, wherein the electrical conductor is enclosed, at least in a first sealing segment, by a sealing body made from an elastic material, wherein the electrical conductor with the sealing body can be inserted into an opening of a housing wall for sealing between sealing body and housing wall, and wherein the electrical conductor has a materially bonded connection with the sealing body, and a fastening part is provided on the conductor and has an axial through-opening through which the electrical conductor is inserted, wherein the fastening part extends radially, starting from the axial through-opening in a first axial segment which has the maximum radial extension of the fastening part perpendicular to the axial through-opening, and wherein the fastening part has, on one side or two sides of the first axial segment, a second axial segment and/or a third axial segment respectively forming a radially circumferential separation region for a casting tool; and the fastening part has grooves running axially in the axial through-opening of the conductor to the sealing body;

the sealing body extends with a segment through the entire through-opening, up to the end, via grooves provided for this purpose in the through-opening;

the axial groves are separated from one another by webs which serve for the radial guidance of the electrical conductor;

a fixing of the electrical conductor perpendicular to the axial direction is achieved by an abutment of the webs 31 on the electrical conductor; and the fastening body is undermolded by the sealing body via the through-opening and the grooves.

2. The electrical conductor according to claim 1, wherein the fastening part can be fastened to a housing wall with at least one fastening means.

3. The electrical conductor according to claim 1, wherein the radial extension of the fastening part from the axial through-opening in the second axial segment and/or third axial segment is in a range of between 0.5 mm and 5 mm.

4. The electrical conductor according to claim 1, wherein the second axial segment and/or third axial segment of the fastening part has an outer contour that is rounded in cross section.

5. The electrical conductor according to claim 1, wherein the electrical conductor has an outer contour that is rounded in cross section, axially adjacent to the fastening part and/or to the sealing body.

6. The electrical conductor according to claim 1, wherein the electrical conductor has an outer contour that is rounded in cross section, at least in the first sealing segment.

7. The electrical conductor according to claim 1, wherein the at least one segment of the sealing body extends in the through-opening between fastening part and electrical conductor.

8. The electrical conductor according to claim 1, wherein provided on the electrical conductor is a latching position, to which the fastening part is axially fixed unidirectionally or bidirectionally by means of a positive connection.

9. A housing wall, wherein the housing wall has an opening, wherein an electrical conductor according to claim 1 is inserted into the opening of the housing wall, wherein the axial segment of the fastening part centers the electrical conductor in the opening of the housing wall.

10. A method for producing an electrical conductor according to claim 1, wherein the method comprises the steps of:
providing an electrical conductor and a fastening part with a through-opening for the electrical conductor;
attaching the fastening part to the electrical conductor;
inserting the electrical conductor with the fastening part into a casting tool; and
vulcanizing and/or injecting a sealing body made of an elastic material at least onto a first, circumferential sealing segment of the electrical conductor, and vulcanizing and/or injecting at least onto a segment of the fastening part.

11. The method according to claim 10, wherein the fastening part is pressed in the casting tool at least at one separation region of the fastening part.

12. The method according to claim 10, wherein the electrical conductor is pre-treated before the fastening part is attached, by compressed air blasting with a solid blasting agent and/or pre-treatment by means of laser beams and/or application of an adhesion promoter.

13. The method according to claim 10, wherein the attachment of the conductor to the sealing body takes place up to a latching position.

* * * * *